United States Patent [19]

Kubota

[11] 4,382,614
[45] May 10, 1983

[54] WEBBING GUIDE DEVICE OF AN AUTOMATIC SEAT BELT APPLYING EQUIPMENT

[75] Inventor: Tatsushi Kubota, Aichi, Japan

[73] Assignee: Tokai-Rika-Seisakusho K.K., Aichi, Japan

[21] Appl. No.: 244,303

[22] Filed: Mar. 16, 1981

[30] Foreign Application Priority Data

Mar. 21, 1980 [JP] Japan .............................. 55-37612[U]

[51] Int. Cl.³ ............................................. B60R 21/10
[52] U.S. Cl. ..................................... 280/802; 297/469
[58] Field of Search ............... 280/802, 803, 807, 808; 297/469, 474, 485

[56] References Cited

U.S. PATENT DOCUMENTS

| | | | |
|---|---|---|---|
| 4,213,637 | 7/1980 | Mauron | 280/802 |
| 4,256,328 | 3/1981 | Thomas | 280/802 |
| 4,258,933 | 3/1981 | Takada | 297/469 |
| 4,262,933 | 4/1981 | Fox | 280/803 |
| 4,324,418 | 4/1982 | Stephenson | 280/802 |

Primary Examiner—Joseph F. Peters, Jr.
Assistant Examiner—John A. Carroll
Attorney, Agent, or Firm—Carroll F. Palmer

[57] ABSTRACT

A seat belt system comprises webbing adapted to restrain a vehicle occupant in a seat, a spring-loaded retractor for the webbing and an electric motor driven guide arm to move the webbing in response to the opening and closing of the vehicle door so that the webbing is moved forward of the occupant to facilitate occupant ingress and egress.

3 Claims, 3 Drawing Figures

WEBBING GUIDE DEVICE OF AN AUTOMATIC SEAT BELT APPLYING EQUIPMENT

BACKGROUND OF THE INVENTION

This invention relates to an automatic seat belt applying equipment whereby a webbing mounted in each seat of a motor vehicle can be applied automatically to an occupant of a seat irrespective of whether or not the occupant intends to wear the seat belt.

Nowadays, motor vehicles are equipped with that type of an automatic seat belt in which a webbing is adapted to move forward and rearward of a seat in response to opening and closing of a door with the aid of a guide arm means, on the free end of which said webbing is slidably supported. Said arm is rotatably mounted adjacent said seat so that the guide arm rotates forward to facilitate extending said webbing and rotates rearwardly to facilitate retracting said webbing. When the occupant of the seat happens to interpose the hand or the like between the guide arm and the seat from, for example, an accidental touch of said arm while the arm is rotating rearward. The occupant's hand, clothes or the like might be caught in between said guide arm and the seat so that possibly the occupant of the seat may get injured, or his clothes or the guide arm itself may get damaged.

OBJECTS

An object of the invention is to provide an improved webbing guide device which keeps the occupant of a seat from getting injured or to prevent his clothes or the guide arm itself from getting damaged even if the occupant accidentally gets between the guide arm and the seat while the guide arm is rotating rearward.

Another object of the invention is to provide an improved webbing guide mechanism in which rotation of an electric motor is transmitted to a guide arm through an intermediate resilient member so as to interrupt said rotation when said arm is subjected to an abnormal external force.

BRIEF DESCRIPTION OF THE DRAWINGS

Other objects as well as features and advantages of the invention will become evident from the description set forth hereinafter when considered in conjunction with the accompanying drawings, in which.

DESCRIPTION OF THE PREFERRED EMBODIMENTS

Figure 1:
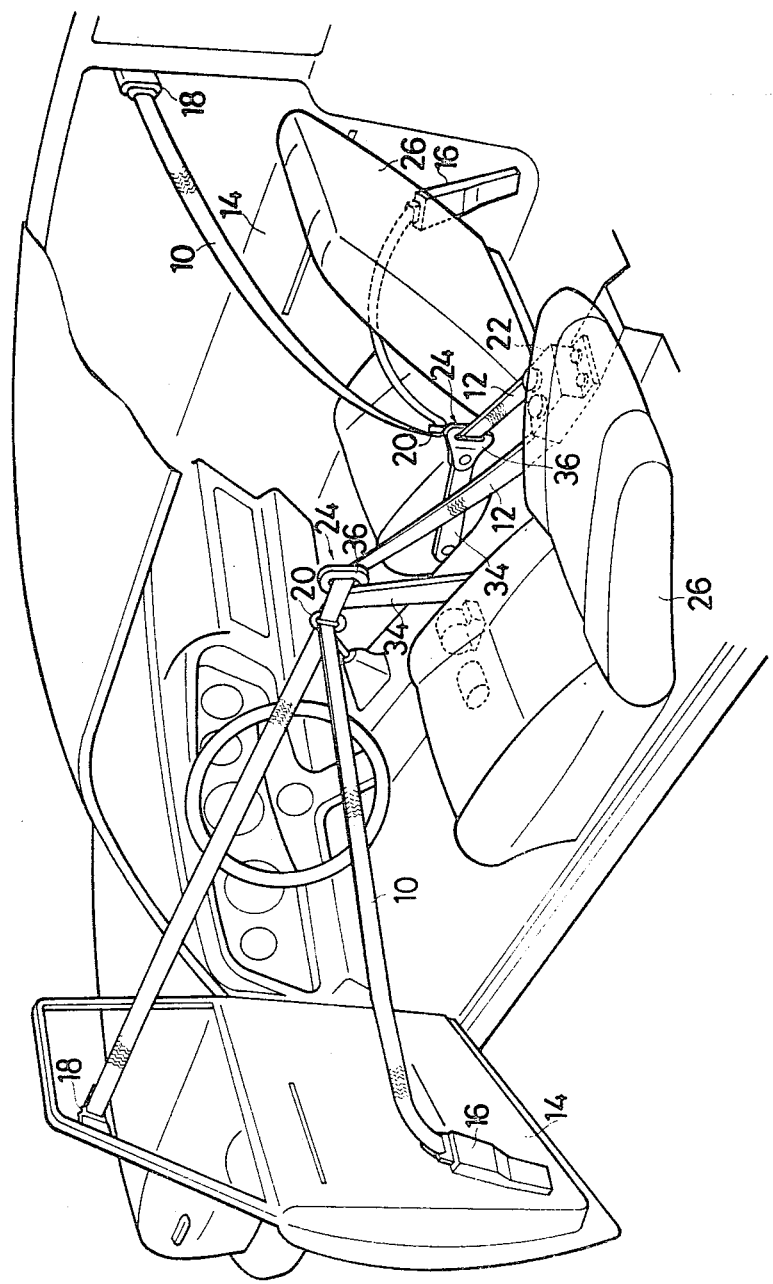
FIG. 1 is an isometric view of a webbing to a vehicle in a preferred embodiment of the invention, particularly illustrating a driver's seat differently from a passenger's seat.
Figure 3:
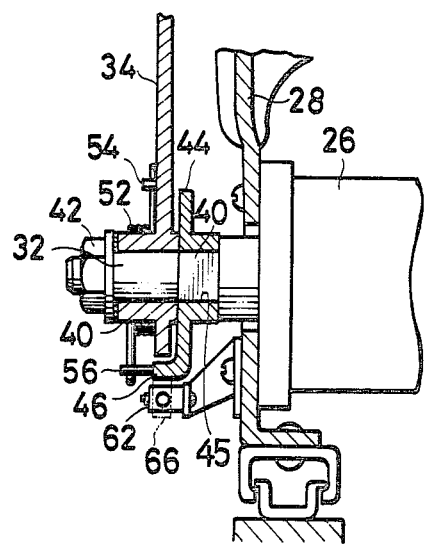
FIG. 3 is a cross sectional view along line III—III of FIG. 2.

In reference to the drawings one embodiment of the invention comprises, an outer webbing 10 and an inner webbing 12 respectively provided with a driver's seat and a passenger's seat in an interior compartment of a vehicle such as a passenger car as seen in FIG. 1.

One end of the outer webbing 10 is secured to a lower portion of a door 14 by means of a first anchor means 16 while the other end of the webbing 10 is secured to an upper portion of the door 14 by means of a second anchor means 18 and an intermediate portion of said outer webbing 10 is slidably passed through a side-loop member 20. On the other end, one end of said inner webbing 12 is fastened to the slide-loop member 20, the other end of said webbing 12 being connected to a spring-loaded retractor 22 which may be firmly secured to or embedded in a floor of the vehicle body so that the webbing 12 can be normally wound thereon by the resilience of the spring. As is well-known said retractor 22 is adapted to normally retract the inner webbing 12 by means of a rotary shaft of said retractor 22 which is at all times exposed to a rotational force of a power spring and the retractor 22 also has an inertia locking mechanism to prevent said rotary shaft from being rotated for stopping the feed of the webbing 12 promptly at an emergency of the vehicle such as collision, for example, at a traffic accident. In the guide apparatus generally represented at 24, a reversible electric motor 26 is mounted on a frame 28 of a seat 30 with an output shaft 32 of the motor 26 being projected outside from the frame 28. Numeral 34 shows a guide arm, at a top free end of which a guide ring 36 is pivoted for rotation by means of a pin 38. Through said guide ring 36 the webbing 12 slidably passes. On the other hand, a lower portion of said guide arm 34 has a boss portion 40 which is rotatably mounted on said output shaft 32. A nut 42 is screwed to an outer end of the output shaft 32 to secure said arm 34 against removal. An intermediate portion of said output shaft 32 is contoured into rectangular-shaped configuration on which a disc member 44 having a central square aperture 45 is inserted so that the disc member 44 may rotate in conjunction with the output shaft 32. From an other peripheral end of the disc member 44, axially projects an arcuate rim 46 as if to surround said boss 40 of the guide arm 34. Both end section of the arcuate rim sections 46 serve as stop portions 48, 50 to limit a rotational movement of the guide arm 34 as will be mentioned below. Numeral 52 shows an resilient member, e.g., a torsion coil spring which is telescopically disposed around the outer surface of the boss portion 40. Each end of said spring 52 is respectively attached to pins 54, 56 each of which is respectively projected from the guide arm 34 and the rim section 46 so that the guide arm 34 is spring biased in the arrowed direction 58 shown in FIG. 2. Consequently if the guide arm 34 is subjected to an external rotational force in the counter-arrowed direction 58, the arm 34 is rotated forward of the vehicle against the biasing force of the spring 52 until the arm 34 engages the stop portion 50. On the other hand, if said rotational force is released, the guide arm 34 is rotated rearwardly owing to the resilient return force of said spring 52 until the arm 34 engages the stop portion 48.

Now, the motor 26 is adapted to rotate in one and the opposite direction by receiving a signal so that the guide arm 34 rotates forward and rearward in response to opening and closing of the door 14. For opening of the door 14, the inner webbing 12 is paid out from the retractor 22 because of the engagement of the stop portion 48 with the guide arm 34 to facilitate occupant ingress and egress. A pair of limit switches 62, 64, which are designed to deenergize said motor 26, are respectively secured to the seat frame 28 so as to position in front and rear side of the projective tongue 66 radially outwardly extended from the rim section 46, whereby the guide arm 34 is allowed to rotate between the limit switches 62, 64 depressed positions by said projective tongue 66 so as to limit rotational movement of the arm 34.

In operation of the embodiment of the invention, there is illustrated the occupant seat with the door 14 opened as shown in FIG. 1 in which the guide arm 34 is rotated forward to its maximum so that the arm 34 engages the stop portion 48. In this situation the webbing 12 is paid out with the assistance of the guide arm 34 to facilitate the occupant ingress and egress. When the door 14 is closed after the occupant is seated, the guide arm 34 is rotated rearwardly from the forward rotated position in the arrowed direction 58 until the projective tongue 66 depresses the limit switch 62, which is to be seen in the passenger's seat of FIG. 1. In association with said rearward rotational movement of the guide arm 34, the webbing 12 is retracted by means of the retractor 22 so that the webbings 10, 12 may be applied to the occupant automatically with the anchor means 16, 18 and the retractor 22 being as supports. The casual forward movement of occupant of the seat 30 from, e.g., the need of relaxation is feasible owing to the fact that the inner webbing 12 is allowed to be gradually paid out from the retractor 22 by its relatively small tensile force. On this occasion, the inner webbing 12 slips through the guide ring 36 so that the guide arm 34 does not accidentally rotate forward even without a discrete locking means which is for preventing the shaft 32 of the motor 26 from a casual rotational movement. Moreover it is noted that the urging force in the arrowed direction 58 by said torsion coil spring 52 shown in FIG. 2 keeps the guide arm 34 from accidental forward rotational movement.

In cases where occupant hand, clothes or the like are caught in between the guide arm 34 and the seat 30 from an accidental touch of the arm 34 while the guide arm 34 is rotating rearwardly, the guide arm 34 is subjected to a blocking-like force, however, the rotational force transmitted from the motor 26 to said arm 34 is interrupted for the cessation of movement of the arm 34 due to the fact that the torsion coil spring 52 is resiliently collapsed by said blocking-like force. This eventually avoids occupant from getting injured or his clothes or the guide arm 34 itself from being damaged. In this case the disc member 44 alone further rotates, while leaving the guide arm 34 stationary until the projective tongue 66 depresses the limit switch 62 to deenergize the motor 26. In this manner the disc member 44 is stopper in its movement by the limit switch 62 after rotating a predetermined angle so as to prevent the clamping-like pressure created between the arm 34 and the seat 30 from progressively increasing in a short moment. And the forward rotational movement of said arm 34 by a manual manipulation permits removal of the articles to be caught in between the guide arm 34 and the seat 30. Following this operation, the release operation of the guide arm 34 from the forward rotated position makes it possible that the arm 34 is rotated back due to the biasing force of the torsion coil spring 52 in the arrowed direction 58 until the arm 34 engages the stop portion 48. As a result, the webbings 10,12 are applied back to the occupant in a suitable manner.

The retractor 22 has the inertia locking mechanism to prevent unwinding of the webbing 12 during emergency conditions such as collision at a traffic accident so that the occupant is safely restrained in the seat 30.

Figure 2:
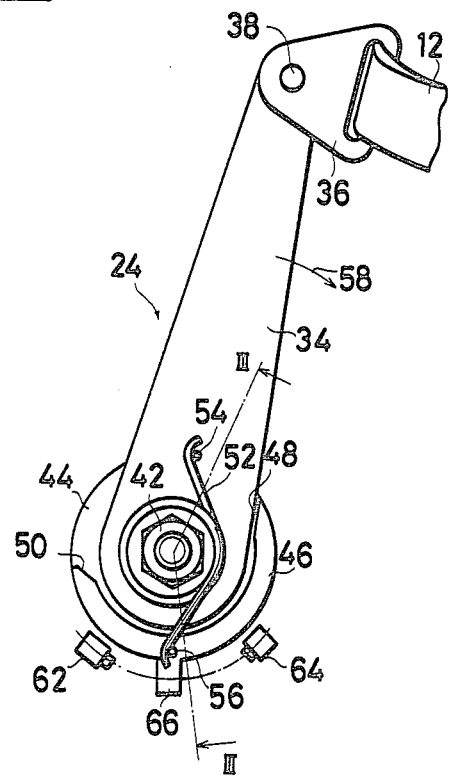
FIG. 2 is an enlarged side elevational view of a webbing guide device.

In compliance with opening of the door 14 as the occupant gets off the vehicle, the reverse rotation of the motor 26 is transmitted to the guide arm 34 because of the engagement of the stop portion 48 with the guide arm 34 so that the guide arm 34 is rotated forward of the vehicle in the counter-arrowed direction 58 as seen in FIG. 2. On the contrary, in compliance with closing of the door 14 after the occupant got on the vehicle, the rotational force of the motor 26 is transmitted through the intermediate torsion coil spring 52 so that the clamping-like pressure created between the arm 34 and the seat 30 is constantly not more than the resilient force of said torsion coil spring 52. Thus even if the occupant's hand or the like is held to be caught in between the arm 34 and the seat 30 for the time being, their injury or damage can be reduced to be as slightly as up to a desired degree since the resilience of the torsion coil spring 52 can be modified as weak as desired.

In addition, what is needed is the simple torsion coil spring 52 to obtain the advantages as said above so that a structurally simple device is provided.

The guide arm 34 is allowed to rotate relatively to the output shaft 32 by a manual manipulation. This provides a ready removal of articles to be caught in between the guide arm 34 and the seat 30. And the guide arm 34 is at all times rearward spring urged so that the webbings 10, 12 are automatically applied back to the occupant of the seat 30 immediately after the articles to be caught in are removed.

Still further, said stop portions 48, act to transmit the rotational force of the motor 26 to the guide arm 34 when the guide arm 34 travels from the rearward rotated position to the forward rotated position, whereby the tensile force applied to the inner webbing 12 is not caused to be a burden of said torsion coil spring 52 even while the inner webbing 12 is paying out from the retractor 22.

In regard to the invention, in another embodiment the output shaft includes both the rotary shaft of the motor and an output shaft of e.g., a speed reducer which is to be driven by said rotary shaft.

What is claimed is:

1. In an automatic seat belt applying assembly having a webbing guide device that moves webbing between a rearward position of occupant restraint and a forward position of occupant release in response to closing and opening respectively of the door of the vehicle adjacent to said assembly, the improvement which comprises:
    an electric motor with a rotary shaft thereon,
    a pivotal lever mounted at one end upon said shaft in free-rotational relationship therewith,
    a guide slot carried by the opposite end of said lever through which said webbing slideably passes,
    a torque transmitter fixed on said shaft for rotation therewith,
    first and second stop means on said torque transmitter setting limits between which said lever may rotate relative to said shaft and said torque transmitter,
    a resilient member that biases said lever toward engagement with said first stop means, whereby
    the torque of said motor is transmitted to said lever through said first stop means when said webbing is moved toward said forward position and is transmitted to said lever through said resilient member when said webbing is moved toward said rearward position.

2. The seat belt assembly of claim 1 wherein said resilient member is a torsion coil spring one end of which is connected to said torque transmitter and the other end of which is attached to said lever.

3. The seat belt assembly of claim 1 wherein said rotary shaft has projection means thereon which is adapted to actuate a limit switch means to deenergize said electric motor when said lever has rotated on said shaft within predetermined rotational boundaries.

* * * * *